Figure 1:
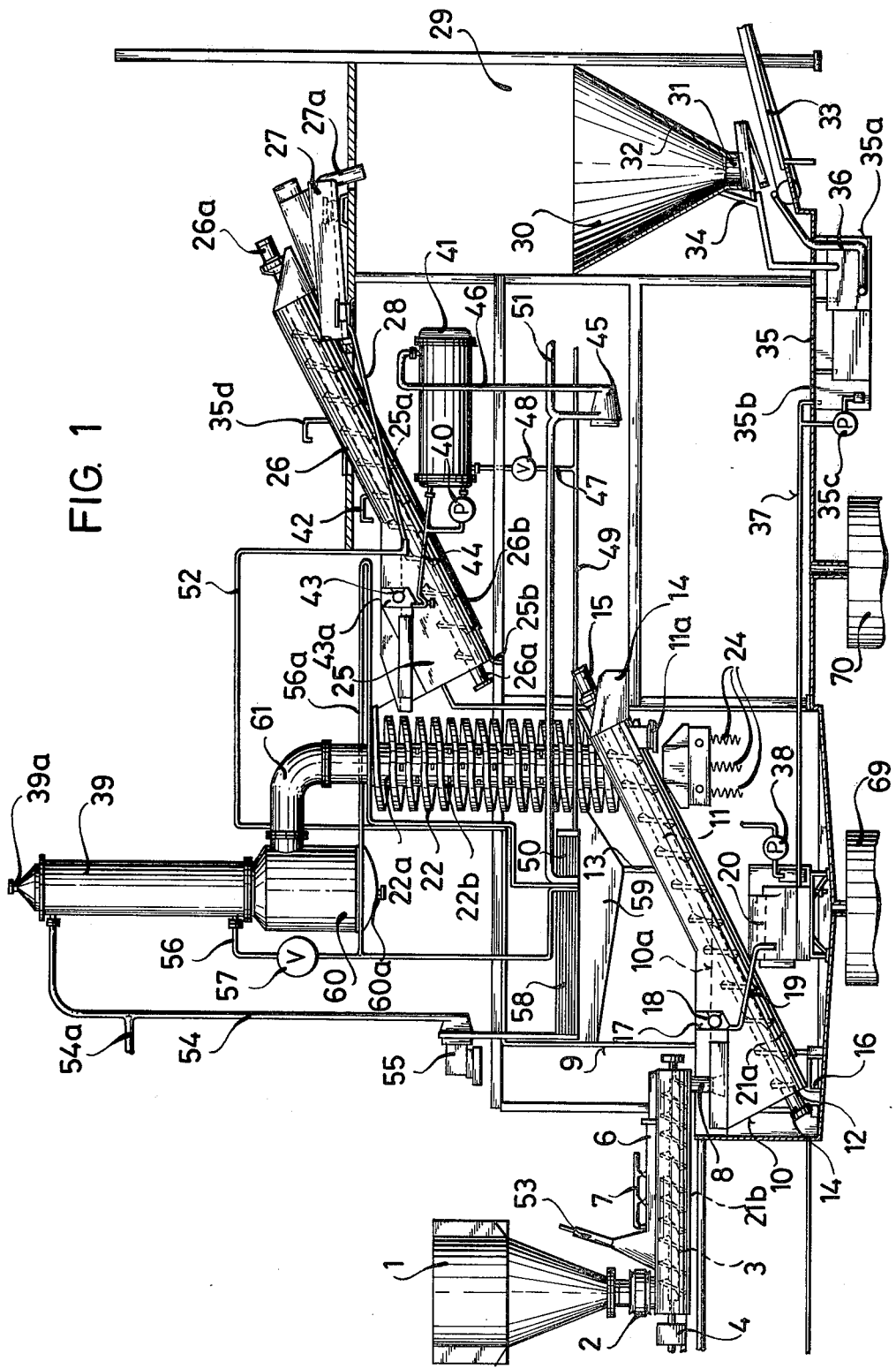

United States Patent [19]

Bahrke

[11] 4,168,714
[45] Sep. 25, 1979

[54] APPARATUS FOR TREATING ROLLING MILL SCALE

[75] Inventor: Ludwig Bahrke, Unna-Massen, Fed. Rep. of Germany

[73] Assignee: Hoesch Werke Aktiengesellschaft, Dortmund, Fed. Rep. of Germany

[21] Appl. No.: 893,076

[22] Filed: Apr. 3, 1978

Related U.S. Application Data

[62] Division of Ser. No. 706,946, Jul. 20, 1976, Pat. No. 4,091,826.

[30] Foreign Application Priority Data

Jul. 22, 1975 [DE] Fed. Rep. of Germany ....... 2532689

[51] Int. Cl.² .............................................. B08B 3/10
[52] U.S. Cl. ...................................... 134/60; 134/63; 134/65; 134/107; 134/109; 202/169
[58] Field of Search ............. 134/25 R, 60, 63, 65–66, 134/105, 107–109, 132; 202/168, 169

[56] References Cited

U.S. PATENT DOCUMENTS

| | | | |
|---|---|---|---|
| 2,137,479 | 11/1938 | Dinley | 134/105 X |
| 3,683,945 | 8/1972 | Weisser | 134/108 X |
| 4,091,826 | 5/1978 | Bahrke | 134/25 R |

Primary Examiner—Robert L. Bleutge
Attorney, Agent, or Firm—Becker & Becker, Inc.

[57] ABSTRACT

An apparatus for treating grease-covered rolling mill scale, according to which the rolling mill scale to be treated is weighed, thoroughly mixed with from 10 to 20% by weight of a solvent e.g. a fluorized chlorohydrocarbon, while finely distributing the greases in the thus obtained mixture. The mixture is then added in a continuous manner to a bath containing such solvent, and is distributed therein. The rolling mill scale is then slowly moved out of the solvent containing bath while mixing the rolling mill scale with an oil-free solvent of the above mentioned type passed in counter-current flow to the last mentioned mill scale. The movement of the thus obtained last mentioned mixture is continued while causing the solvent to drip off out of the grease-free rolling mill scale. The rolling mill scale is then heated, and the residual solvent is driven out of the rolling mill scale. Finally, the grease-containing solvent is regenerated by distilling the same, and the oil-free solvent is condensed and fed back to grease-covered rolling mill scale to be degreased.

26 Claims, 2 Drawing Figures

4,168,714

APPARATUS FOR TREATING ROLLING MILL SCALE

This is a division of co-pending application Ser. No. 706,946—Bahrke filed July 20, 1976, now U.S. Pat. No. 4,091,826—Bahrke issued May 30, 1978.

The present invention relates to apparatus for treating by means of a solvent rolling mill scale from rolling mills, especially hot rolling mills, which is covered by or contaminated with grease.

In rolling mills, especially hot rolling mills, in which steel profiles are hot rolled, great quantities of rolling mill scale contaminated with grease or oil are obtained during the rolling operation. Due to its high iron content, amounting to approximately 70% iron, this rolling mill scale represents a valuable raw material and, therefore, is reused. Customarily, to this end, the rolling mill scale is supplied to sintering plants and added to a sinter mixture. If the rolling mill scale has previously not substantially been freed from its grease content which may greatly vary and may amount up to 15%, considerably difficulties may be encountered in the sintering plant, especially in the exhaust gas cleaning systems as a result of which the sintering plant may be forced to stop. Therefore, it has already been suggested to wash the rolling mill scale with alkaline substances or to separate the grease in a rotary kiln or revolving cyclindrical furnace. These suggestions, however, could not be realized since they would create considerable ecological problems, espcially with regard to the purification of the waste water and the contamination of the air. In addition to the problem of air contamination, according to another heretofore known method according to which the grease is removed from the rolling mill scale by combustion in a turbulence bed, considerable additional energy is required since the grease content of the rolling mill scale does not suffice to maintain the combustion. Also the experience gathered in connection with the de-greasing of small parts to be treated galvanically cannot contribute to the solution of the problem involved since for instance the small parts there to be treated are in batches in wire baskets introduced into vapors of a solvent. Rolling mill scale in contrast must, in order to be suitable for further use in sintering plants, have a granular size of from 0 to 8 mm so that a degreasing in wire baskets is not feasible in view of said granular size and the obtained large quantities of rolling mill scale. Furthermore, in the said plants, a recovery of solvents is only of secondary importance.

It is an object of the present invention to provide an apparatus by means of which the rolling mill scale which is obtained in rolling mills, especially hot rolling mills, and which has a non-uniform grease content, can in a continuous manner and in a minimum of time, be de-greased without creating great ecological problems, while the method can be practiced in a simple and economical manner and will permit a disturbance-free further utilization of the de-greased mill scale.

These and other objects and advantages of the present invention will appear more clearly from the following specification in connection with the accompany drawings, in which:

FIG. 1 diagrammatically illustrates a device according to the present invention.

Figure 2:
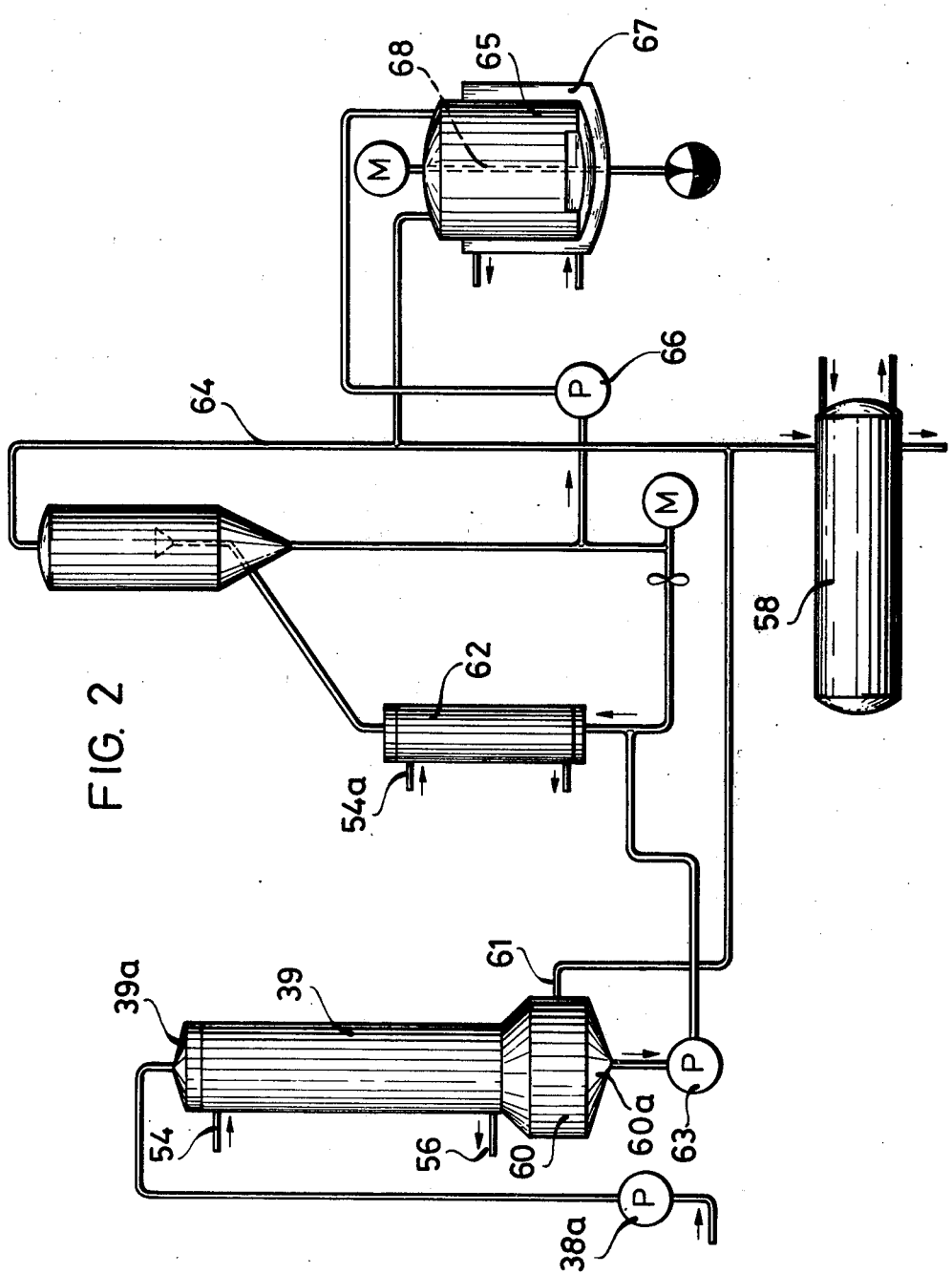

FIG. 2 shows an arrangement for use in connection with the device of FIG. 1 in case the entire installation has to be stopped for instance for carrying out repair work on the plant.

The method according to the present invention is characterized primarily in that the rolling mill scale after it has been weighed is thoroughly intermixed with from 10 to 20% by weight of a solvent, e.g. a fluorized chlorohydrocarbon, and the grease is finely distributed in the mixture. The mixture is in a continuous manner added to a bath containing the solvent and distributed therein. The rolling mill scale is slowly withdrawn from said bath while being intermixed with an oil-free solvent flowing in countercurrent flow thereto. While the rolling mill scale is being conveyed further, the solvent is drained off from the grease-free rolling mill scale and the rolling mill scale is heated. The remaining solvent is driven out of the rolling mill scale. The rolling mill scale is then dried, and the grease-containing solvent is regenerated by way of distillation. The oil-free solvent is condensed and in circulation is conveyed to the grease-containing rolling mill scale.

Advantageously, a portion of the grease-containing solvent is without preliminary prepartion mixed with the weighed grease-containing rolling mill scale. It is further advantageous to convey the rolling mill scale from the solvent containing bath at a low speed, said bath having a depth of 1 to 1.5 meters, and said low speed being within the range of from 5 to 10 meters per minute.

In the further course of the method, the residual solvent is in a simple and economical manner driven out of the grease-free rolling mill scale by heating the mill scale up to a temperature of from 40 to 45° C. For this purpose, preferably hot water is utilized with a temperature of from 50 to 60° C. This water is circulated after it has been filtered and reheated.

This distillation of collected grease-containing solvent is expediently carried out after a filtration and the separation from water. Advantageously, during the treatment of the rolling mill scale by means of solvents, a slight underpressure is maintained while also from the air-solvent vapor-water steam-mixture, withdrawn for maintaining the underpressure, the solvent is separated and is again conveyed to the circuit for the solvent. According to an advantageous further development of the method according to the inventiion, the grease-containing solvent is for purposes of regeneration subjected to a multi-step, especially three-step distillation. The first two steps are carried out in a continuous manner, whereas the last step is carried out in a discontinuous manner and preferably under a vacuum of from 35 to 45 Torr.

As solvents, solvents of an organic nature, are suitable and especially fluorized chlorohydrocarbons of which latter fluorotrichlormethane has proved particularly advantageous in this connection.

The drop-free rolling mill scale obtained after the treatment is, depending on the intended use, prior to its further use, screened for instance in a sintering plant to the desire granular size. A particularly suitable device for practicing the method according to the invention is so designed that a driven, horizontally arranged double-shaft mixer provided with a feeding device for a solvent is connected to a weighing device. The outlet of the said mixer comprises an outlet funnel having its opening extend into a settling or receiving tank provided with a bath of a solvent. Arranged in said tank is one end of a conveyor worm which conveys upwards at an inclination while above said conveyor worm there is provided a feeding device for a solvent. At the discharge end of said conveyor worm there is arranged the feeding end of spiral reciprocatory plate feeders at the upper outlet of which there is located a receiving or settling tank with a conveyor worm having connected thereto a draining screen and a drip-off silo. This arrangement is closed off in a gas-tight manner from the atmosphere by a housing. Furthermore, there is provided a distilling and condensing device for recovering the solvent.

The advantages of the device according to the present invention consist primarily in that the difficulties heretofore encountered in connection with the further processing of the rolling mill scale contaminated with grease have been eliminated by relatively little consumption of energy and without great ecological problems. In view of the circulated water and solvent, neither waste water problems nor polluted air problems occur. Nevertheless, these great advantages have been realized by a relatively short treatment of the rolling mill scale in a simple and economical manner.

The method for treating the rolling mill scale may preferably be carried out in a device according to the invention which will now be described in detail in connection with the attached drawings.

The moist rolling mill scale contaminated with grease is after having been weighed and screened to a granular size of less than 8mm diameter passed into a weighing bin 1 (FIG. 1) which simultaneously serves as gas barrier. The bin 1 is by means of a withdrawing trough 2 in a gas-tight manner connected to a horizontally extending double-shaft mixer 3 which is driven by driving means 4.

In that portion of the mantle 6 of the double-shaft mixer 3 which is located at the top area there are provided supply openings 7 for the supply of solvent for the grease.

Within the mixer 3, the rolling mill scale is thoroughly intermixed with an amount of oil-free grease solvent about from 10 to 20% by weight of the scale while also finest granular agglomerates with a very high grease content, for instance filter sludges, are split up so that the best possible distribution of the grease in the mixture will be obtained.

That end of the mixer 3 which is remote from that mixer end where the rolling mill scale is charged into the mixer is provided with a downwardly extending discharge funnel 8. The funnel 8 extends through the opening of a housing 9 to a point below the surface 10a of the solvent contained in the tank 10. Rolling mill scale is in a continuous manner through the funnel 8 passed into the bath containing the solvent and fed into the tank 10 and during its drop is distributed in the solvent, said bath having a depth of from about 1 to 1.5 meters. In the receiving tank 10, in the worm trough 12 there is arranged one end of a conveyor worm 11 by means of which the rolling mill scale is from the tank 10 at a slow conveyor speed conveyed upwardly at an inclined angle while a moderate intermixing is effected. Above the region of the conveyor worm 11 in which region the conveyor worm 11 is no longer convered by the solvent in the tank 10, there is provided a feeding device 13 for the addition of fresh oil-free solvent which is fed in counter current flow to the rolling mill scale conveyed by the conveyor worm 11. The conveyor worm 11 is journalled in bearings 14 and is driven by a drive 15. At the lower end of the worm trough 12 there is provided a connection 16 for discharging the residue.

Due to the continuous in-flow of solvents, the tank 10 is provided with an overflow 17 comprising a filter 18, for instance a magnetic settling filter through which the grease-containing solvent and water pass through a pipe 19 into a buffer tank 20 which is located below the conveyor worm 11. The tank 20 which at the same time serves as water separator is necessary particularly for equalizing variations in the quantity of solvent for the subsequent distillation and regeneration of the solvent. The worm trough 12 as well as the double-shaft-mixer 3 are respectively provided with a heating mantle 21a, 21b adapted to be heated electrically.

At the discharge end of the conveyor worm 11 there is provided the charging end of helical reciprocatory plate feeders 22 of which one only is shown and by means of which the extensively de-greased rolling mill scale is fed upwardly. For purposes of distributing the rolling mill scale discharged by the conveyor worm 11, on for instance two helical reciprocatory plate feeders 22, the discharge opening of the conveyor worm 11 is provided with an adjustable saddle 11a. Vapors of the solvent as they originate from the upwardly conveyed rolling mill scale are on the helical reciprocatory plate feeder 22 met in countercurrent flow by vapors from the solvent, which vapors originate with the subsequent drying and distillation. In this connection, the vapors condense on the rolling mill scale and heat up the latter. The condensed solvent passes through gap covers (Spaltbeläge) which are arranged in the upper spirals and pertain to the reciprocatory plate feeders 22, and through a non-illustrated discharge line back into the conveyor worm 11. The feeder 22 is mounted on springs 24. The conveying speed of the feeder 22 is advantageously adjustable.

The de-greased rolling mill scale is at the upper end of said feeder 22 discharged into another receiving tank 25 which contains hot water, in which the solvent residues are separated by a further heating of the rolling mill scale to a temperature of from about 40 to 45° C. From this tank 25 the rolling mill scale is by means of a further conveyor worm 26 conveyed to a draining screen 27 which is provided with a discharge 28 which extends back into the receiving tank 25. The conveyor worm 26 is journalled in bearings 26a.

From the draining screen 27, the rolling mill scale passes through a chute 27a into a drip-silo 29 which has its discharge cone 30 provided with a discharge trough channel 31 through which the now drip-free rolling mill scale passes for instance onto a conveyor belt 33 or any other suitable transporting means. The discharge cone 30 is designed as a double-sheet mantle while the inner sheet mantle 32 is designed as a perforated sheet through the holes of which the drip water flows through a discharge pipe 34 into a drip-water tank 35. The fine or finest rolling mill scale particles which might flow along are retained in an overflow part 35a of the drip-water tank 35 and by means of a magnetic belt conveyor 36 are on the conveyor belt 33 added to the rolling mill scale withdrawn from the drip-silo 29.

The water separated in the buffer tank 20 is through an overflow 37 withdrawn continuously and conveyed to the drip-water tank 35. A portion of the grease-containing solvent accumulated in the buffer tank 20 is by means of a pump 38 conveyed to the feeding openings 7 of the double-shaft mixer 3. The main portion of the grease-containing solvent accumulated in the buffer tank 20 is continuously by means of an additional pump 38a (FIG. 2) through the charging opening 39a conveyed to the first stage of a distilling device, a pre-evaporator 39.

The water caught in a second overflow part 35b of the drip-water tank 35 is by means of a pump 35c conveyed through conduit 35d to the rolling mill scale which is conveyed by the conveyor worm 26.

As solvent, in the present embodiment, a fluorized chlorohydrocarbon, preferably fluorotrichloromethane (CFCI₃) is used which at 760 Torr has its boiling point at 23.8° C. and has a density of 1.49 grams per cubic centimeter at a temperature of 20° C.

In view of the low boiling point of this solvent, the solvent residues which are still in the rolling mill scale deposited from the helical reciprocatory plate feeder 22 into the receiving tank 25 are in a simple manner driven out or separated by a further heating of the rolling mill scale.

As medium for this heating up, hot water with a temperature of from about 50 to 60° C. has advantageously been employed which is by means of a hot water pump continuously pumped through a pipe 42 into the receiving tank 25 up to a level 25a. Pump 40 is connected to a heat exchanger 41. The excess water is following the filtering operation in a filter 43, for instance in a magnetic settling filter, arranged in an overflow 43a of tank 25, for purposes of being heated up again conveyed to the heat exchanger 41 through the conduit 44. For a better exploitation of the heat, the tank 25 and the worm trough 26b are provided with a good heat insulation.

The rolling mill scale conveyed by the conveyor worm 26 to the draining screen 27 will thus be free from grease and free from all of the solvent.

The energy required for heating up the water from 40° C. to a temperature of from 50 to 60° C. is conveyed to the system due to the fact that the heat exchanger 41 simultaneously serves as condenser of a heat pump the evaporator of which in the present example comprises a vapor condenser 50 and a non-illustrated washing oil cooler for the treatment of the exhaust air. The conduit 47 for the condensate, the expansion valve 48, the steam conduit 51 and the compressor 45 represent further important components of the heat pump. The conduit 47 which comes out of the heat exchanger 41 has interposed therein the expansion valve 48 and is connected to the conduit 49 for the condensate of the vapor condenser 50 which leads to the washing oil cooler. The compressor 45 is built into the steam conduit 51 and is through a pipe 46 connected to the heat exchanger 41.

The entire space in which the rolling mill scale is treated by the solvent is sealed in a gas-tight manner relative to the atmosphere, and more specifically at the start of the treatment path, by the material which is continuously in the weighing bin 1, namely by the grease-containing moist rolling mill scale, and at the end of the treatment path by an immersion wall 52 of housing 9 which immerses into the water in the tank 25.

For purposes of maintaining a slight underpressure of from about 1 to 3 mm water column in the mentioned treatment chamber in order to prevent leakage losses in solvent, withdrawing devices are provided of which merely the withdrawing device 53 above the double-shaft mixer 3 is illustrated.

In the pre-evaporator 39 which is designed as a drop film or gravity evaporator, the main quantity of the solvent pumped by pump 38a from the tank 20 into the evaporator 39, is freed from grease and oil. To this end, as heating medium, the vapor of a refrigerating agent or cooling medium of a temperature of about 550° C. is conveyed to the pre-evaporator 39 through a conduit 54 from a compressor 55 of a heat pump. The refrigerating agent or cooling medium which has been condensed in the drop film or gravity evaporator or pre-evaporator 39 passes to the condenser 58 through conduit 56 which has an expansive valve 57 interposed therein. The there formed vapor of the refrigerating agent or cooling medium is conveyed by the compressor 55. The condenser 58 on which the vapors of the solvent enclosed in housing 9 condense, is arranged only slightly above the conveyor worm 11. The condensed solvent is caught in the funnel 59 and through the feeding device 13 is in a counter-current flow added to the rolling mill scale in the conveyor worm 11.

The vapors of the solvent which have been separated from the grease-solvent mixture in the pre-evaporator 39 pass from the vapor chamber 60 through vapor conveying conduit 61 into the hollow supporting columns 22a of the helical reciprocatory plate feeders 22. The vapors of the solvent are discharged through the openings 22b and partially condense on the upwardly conveyed cold rolling mill scale while heating up the latter. The main quantity condenses on the condensers 50 and 58. The grease-free condensate passes through the collecting funnels 59 and the feeding device 13 back into the circuit.

The pre-concentrated discharge from the pre-evaporator 38 with from about 3 to 6% oil or grease is withdrawn at the bottom of the vapor-collecting chamber 60 through connections 60a and by means of a pump 63 is supplied to the second distilling stage (FIG. 2) designed as forced circulation evaporator 62.

In the forced circulation evaporator 62, the oil is at a temperature of about 45° C. further concentrated up to about from 70 to 75%, and the obtained vapors of the solvent are through the conduit 64 conveyed to the condenser 58 where they are condensed and following the condensation are collected in the collecting funnel 59. The heating medium is through a branch 54a of the conduit 54 by means of the compressor 55 of the heat pump conveyed to be forced circulation evaporation 62.

Whereas the first and second stage of the separation of the solvent from the oil are continuously carried out in the pre-evaporator 39 and in the forced circulation evaporator 62, the final concentration of the oil is effected by batches in the third stage. To this end, two containers 65 are provided which are arranged parallel to each other and which operate as end evaporators.

Only one of these containers 65 is illustrated. The oil is alternately conveyed into said containers 65 from the evaporator 62 by means of a pump 66. The containers 65 are adapted to be heated to about 95° C. for instance by means of an electric mantle heating system 67 and are provided with a vacuum installation for generating a vacuum of from 35 to 45 Torr and are furthermore provided with a motor-driven agitating device 68.

The remaining vapors of the solvent which form during the treatment of the oil at a vacuum in the heated container 65 are likewise conveyed to the condenser 58 and after the condensation are conveyed to the collecting funnel 59. The oil which for all practical purposes is now free from any solvent is withdrawn from the container and is collected in a heat insulated container (not illustrated) which, if desired, may also be adapted to be heated. From here the oil is conveyed to be desired place where it may be reused.

Above the feeder 22 and the tank 25, a branch conduit 56a brandhing off from conduit 56 extends to the immersion wall 52 and back into the condenser 58 so that the vapors of the solvent can condense on the branch conduit 56a and are prevented from passing into the drip-silo 29.

When the entire plant is stopped, for instance for carrying out repair work, the vapors of the solvent, the solvent, and the hot water have to be withdrawn from the installation.

To this end, in addition to the heating mantles 21a and 21b for the double-shaft mixer 3 and the worm trough 12, collecting containers 69, 70 for the solvent and the hot water are provided for heating the residual solvent and for the residue discharging connections 16 and 25b in the tanks 10 and 25. The collecting containers 69 and 70 are arranged below the deepest point of the installation. The collecting container 69 for the solvent is provided with a non-illustrated cooling device for condensing vapors of the solvent and for cooling the liquid solvent.

The collecting container 70 for the hot water on the other hand is provided with a heating device in order to maintain at the necessary temperature the hot water withdrawn from the tank 25 through the residue discharging connection 25b.

If the plant after a standstill is again started, hot water from the collecting container 70 and solvent from the container 69 are again conveyed back through non-illustrated conveyor pumps.

It is, of course, to be understood that the present invention is, by no means, limited to the specific showing in the drawings, but also comprises any modifications within the scope of the appended claims.

What I claim is:

1. An apparatus for treating grease-covered rolling mill scale from rolling mills, especially hot rolling mills, by means of solvents, which includes: weighing means, a horizontal double-shaft mixer connected to said weighing means, driving means for driving said mixer, a first receiving tank, adapted to receive a solvent containing bath, said mixer including outlet means having an opening extending into said receiving tank, a conveyor worm partially located in said receiving tank and operable to convey upwardly at an incline, solvent feeding means arranged above said conveyor worm and having a discharge end, helical reciprocatory plate feeder means having a charging end arranged at the discharging end of said solvent feeding means, said reciprocatory plate feeder means also having an upper discharge, a second receiving tank arranged at said upper discharge and provided with a conveyor worm, draining screen means and drip-off silo means both operatively connected to said last mentioned conveyor worm, housing means sealing said apparatus toward the outside in a gas-tight manner, and distilling and condensing means for recovering at least a considerable portion of said solvent.

2. An apparatus according to claim 1, which includes a weighing bin arranged between said weighing means and said double-shaft mixer, and forming a gas barrier, withdrawing conduit means connected gas-tight to said double-shaft mixer, said housing means including immersing wall means immersing into said second receiving tank, and drawing off means for maintaining a desired underpressure in the interior of said housing means.

3. An apparatus according to claim 2 which includes hollow support columns supporting the helices of said helical reciprocatory plate feeder means and provided with openings for vapors, the upper ones of said helices being provided with slit covers, and conduit means connected to said slit covers and leading to said conveyor worm.

4. An apparatus according to claim 2, which includes heating mantle means respectively associated with said double-shaft mixer and said worm trough, residue withdrawing connections respectively associated with said first and second receiving tanks, and collecting tanks arranged below the lowest point of said apparatus.

5. An apparatus according to claim 4, which includes cooling means associated with one of said collecting tanks, and heating means associated with the other one of said collecting tanks.

6. An apparatus according to claim 1, in which the discharge end of said conveyor worm is provided with an adjustable saddle.

7. An apparatus according to claim 1, which includes a buffer tank, and in which said first receiving tank of said conveyor worm has overflow means connected to said buffer tank.

8. An apparatus according to claim 7, in which said overflow means is provided with a filter.

9. An apparatus according to claim 7, in which said overflow means is provided with a magnetic settling filter.

10. An apparatus according to claim 7, in which said double-shaft mixer has a mantle provided with supply openings for supplying grease solvents, and which includes pump means connected to said buffer tank and communicating with said supply openings.

11. An apparatus according to claim 10, which includes additional pump means arranged between said buffer tank and said distilling device.

12. An apparatus according to claim 10, which includes: a first evaporator having a charge opening, a vapor chamber flanged to said first evaporator, a second evaporator having a discharge, two end evaporators operable in parallel, a heat pump, and electric mantle heating means, and in which said pump means is interposed between said buffer tank and said distilling device, and communicates with said charge opening, and in which said discharge of said second evaporator is connected to said two end evaporators, said first evaporator and said second evaporator being adapted to be heated by said heat pump, and said end evaporators being adapted to be heated by said electric mantle heating means.

13. An apparatus according to claim 12, which includes first pipeline means, an compressor, second pipeline means provided with expansion valve means, and condenser means, and in which said first evaporator is through said first pipeline means connected to said compressor and through said second pipeline means is connected to said condenser means, the latter being connected to said compressor.

14. An apparatus according to claim 13, which includes a vapor conveying line, and in which said vapor chamber is connected to said hollow supports for said helical reciprocatory plate feeders by said vapor conveying line.

15. An apparatus according to claim 13, which includes a branch line branching off said second pipeline above said helical reciprocatory plate feeders and said second receiving tank and leading to said immersing wall of said housing means and being connected to said condenser means.

16. An apparatus according to claim 13, which includes a collecting funnel with discharging means simultaneously serving as feeding device, and in which said condensing means are arranged adjacent to each other and above said conveyor worm in slightly spaced relationship thereto, and in which said collecting funnel is arranged below said condensing means.

17. An apparatus according to claim 13, in which said first pipeline means is provided with a branch line, and in which said second evaporator is connected to said heat pump through said branch line.

18. An apparatus according to claim 12, in which said first evaporator is designed to drop film evaporator, and in which said second evaporator is designed as forced circulation evaporator.

19. An apparatus according to claim 12, which includes vacuum means associated with said end evaporators.

20. An apparatus according to claim 1, which includes a hot water supply associated with said second receiving tank, and also includes a pump, and a heat exchanger connected through said pump to said hot water supply, said apparatus furthermore including overflow means with a filter for excess water in said second receiving tank, and means interconnecting said overflow means with said heat exchanger.

21. An apparatus according to claim 20, which includes a heat pump, and wherein said heat exchanger simultaneously acts as a condenser of said heat pump.

22. An apparatus according to claim 21 which includes: a vapor condenser forming an evaporator for said heat pump, and also includes cooling means for washing oil, a relief expansion valve installed in a condensate conduit of said heat exchanger and compressor means provided in a vapor conduit connecting said vapor condenser and said washing oil cooling means, said compressor means communicating with said heat exchanger.

23. An apparatus according to claim 1, which includes discharge means connected to said draining screen and leading into said second receiving tank.

24. An apparatus according to claim 1, which includes a conveyor trough associated with said conveyor, and in which said second receiving tank and said conveyor trough are provided with a heat insulation.

25. An apparatus according to claim 1, in which said drip-off silo is provided with a discharge cone having a double sheet metal mantle including an inner wall forming a perforated plate, said discharge cone also having a discharge conduit, and which includes a drip-off water tank with overflow and a discharge pipe leading into said drip-off water tank, transporting means, and a magnetic belt conveyor provided in said overflow and leading to said transporting means.

26. An apparatus according to claim 25, which includes overflow means connecting said buffer tank to said drip-off water tank.

* * * * *